W. F. STIMPSON.
SCALE.
APPLICATION FILED APR. 20, 1911.

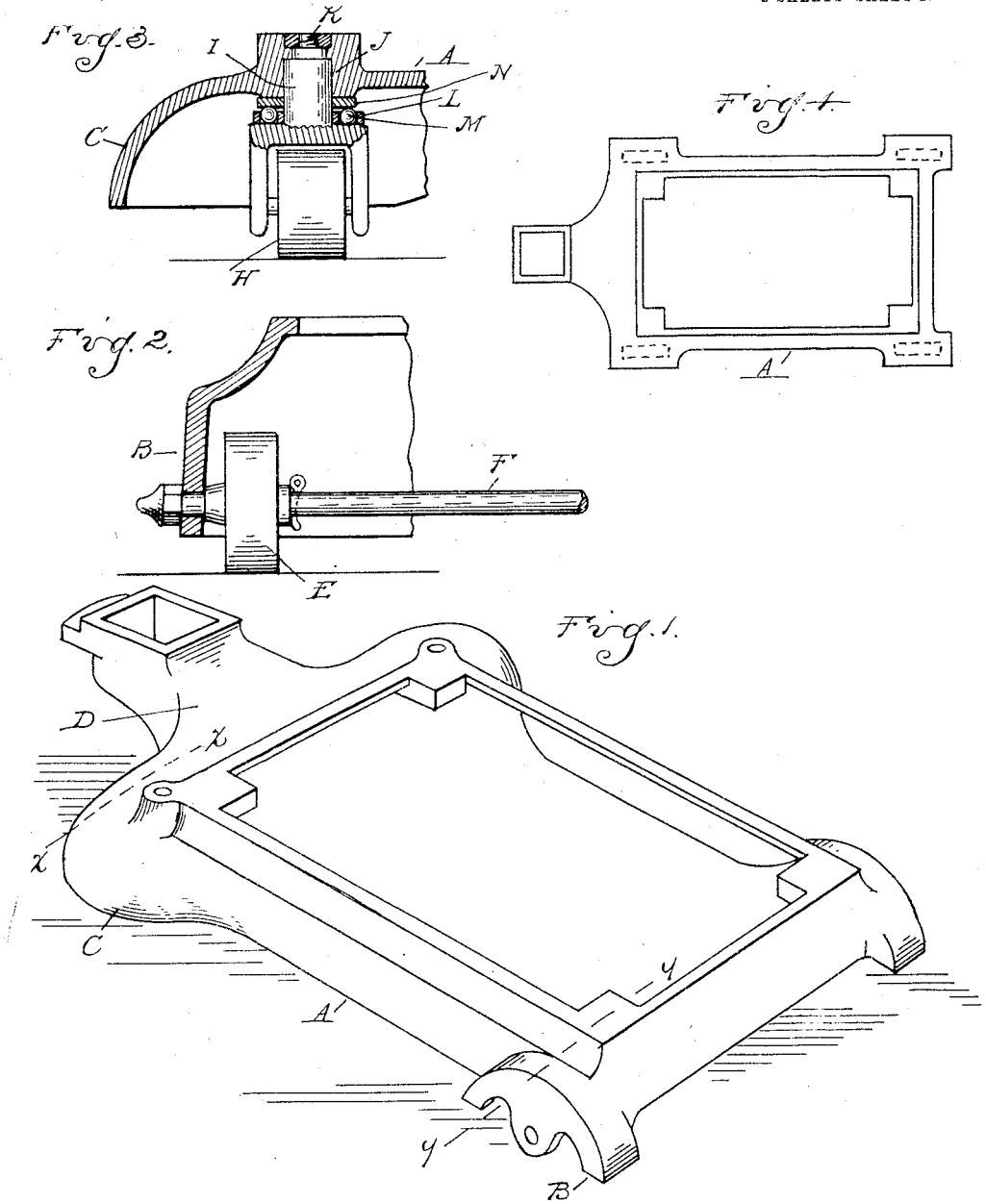

1,041,369.

Patented Oct. 15, 1912.

2 SHEETS—SHEET 2.

Witnesses

Inventor
Walter F. Stimpson
By
attys

UNITED STATES PATENT OFFICE.

WALTER F. STIMPSON, OF DETROIT, MICHIGAN, ASSIGNOR, BY MESNE ASSIGNMENTS, TO THE COMMERCIAL SAVINGS BANK & TRUST COMPANY, TRUSTEE, OF TOLEDO, OHIO, A CORPORATION OF OHIO.

SCALE.

1,041,369.

Specification of Letters Patent.

Patented Oct. 15, 1912.

Application filed April 26, 1911. Serial No. 623,252.

*To all whom it may concern:*

Be it known that I, WALTER F. STIMPSON, a citizen of the United States of America, residing at Detroit, in the county of Wayne and State of Michigan, have invented certain new and useful Improvements in Scales, of which the following is a specification, reference being had therein to the accompanying drawings.

It is the object of the invention to obtain a swiveled or caster roller support for the scale.

It is a further object to obtain a support without increasing the space between the lower plane of the base and the floor.

Still, further, it is an object to so construct the base as to house the supporting wheels and conceal the same from view.

With these objects in view, the invention consists in the construction as hereinafter set forth.

Figure 5:
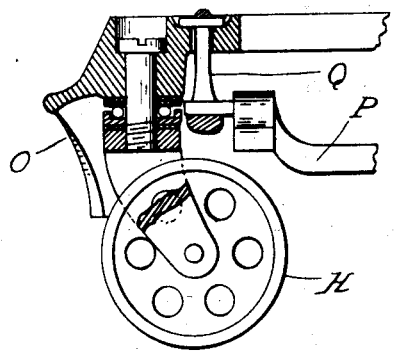
Figure 6:
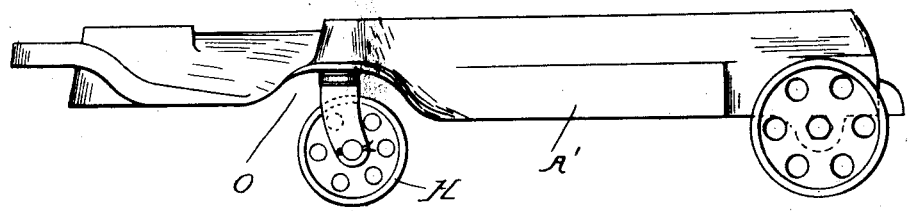

In the drawings,—Figure 1 is a perspective view of the scale base with the platform and levers removed therefrom; Fig. 2 is a section on line Y—Y, Fig. 1; Fig. 3 is a cross section on line X—X Fig. 2; Fig. 4 is a plan view; Fig. 5 is a section through a modified construction of frame showing the relation of the caster rolls and platform levers; Fig. 6 is a side elevation of the construction shown in Fig. 5.

It is usual in the construction of platform scales having wheeled bases to arrange the wheels outside of the line of the base. It is also customary to journal these wheels upon axles that are parallel to each other, and extend transverse to the base, so that in turning it is generally necessary to lift one end of the base or slide the wheels laterally.

With the present construction, the wheels are concealed within the base, and at the same time stability is secured by arranging the wheels in outwardly-projecting hollow lugs. Thus, substantially the same width of wheel-base is secured, while the wheels are both concealed and protected.

Another feature of the invention is the construction of swiveled wheels for supporting one end of the base preferably in the forward end, which greatly facilitates turning.

As shown, A is the scale base, which is preferably of the usual substantial rectangular form, but is provided at each of its corners with outwardly-projecting hollow portions. At the rear end, these projections B are of substantially segmental cylindrical form, but at the forward end they are preferably in the form of dome segments C. These merge into the forward central portion D' which forms the base for the scale standard.

The rear wheels E are preferably journaled upon an axle F, which extends across the base and is secured in bearings G at the center of the cylindrical segments B. At the forward end similar wheels may, if desired, be employed, and such a construction is illustrated in Fig. 4, but I preferably provide swiveled wheels for the purpose already stated. These swivel wheels H are preferably provided with shanks I, which extend upward into sockets J formed in the base, and are swiveled therein, being preferably secured in position by a shoulder screw K. A ball bearing is preferably arranged to take the thrust and, as shown, this consists of a ball carrier or retainer L sleeved upon the shank I, and having pockets for the balls M. N is a hardened bearing plate also sleeved upon the shank intermediate the balls and the bearing on the base.

With the construction described, it will be understood that the scale may be easily moved about in any direction, the swiveled casters turning with each change in direction. At the same time, a stable support is afforded for the base, and the wheels are both concealed and protected.

In place of arranging the swiveled supporting wheels in the hollow projections of the base, they may be arranged upon a base which is cut away at the side to provide clearance for the wheels. Such a construction is illustrated in Figs. 5 and 6 in which are recesses or cut-away portions in the base frame A' which provide clearance for the turning of the swiveled axle wheels H.

As shown in Figs. 2 and 5 the shanks I of the swiveled wheels engage sockets J at the corners of the base. These sockets are so positioned as to clear the platform levers P and supporting loops Q therefor, and the wheels H are permitted to turn beneath these parts as shown in Fig. 5. This construction secures a strong and suitable support for the scale face on the caster wheels and at the same time permits said wheels to extend upward above the lower line of the base so as to avoid an objectionable elevation of the latter. This is true whether the wheels are housed in the projection C or the frame is cut-away at O to provide clearance for the wheels.

What I claim as my invention is:

1. In a scale, a base frame, having hollow projections at the several corners thereof and supporting wheels housed within said hollow projections, the wheels at one end of said frame being swiveled, and an axle forming a journal for the wheels at the opposite end of said frame.

2. In a scale, the combination with the base frame, and platform levers supported therein, of a caster wheel, and a swivel bearing for said caster wheel at the corner of said base in close proximity to one of said levers but clearing the same and permitting the wheel to swing beneath the levers.

3. In a scale, a base frame having hollow projections at the several corners thereof, and supporting wheels housed within said hollow projections, the wheels at one end of said frame being swiveled, and the axes of the wheels at the opposite end being fixed.

4. The combination with a scale base having hollow projections at the several corners thereof, and supporting wheels housed within said hollow projections mounted so as to project upwardly above the plane of the lower edge of the base, the wheels at one end of the frame being swiveled and the axes of the wheels at the opposite end being fixed.

5. The combination with a scale base having a hollow projection extending outward therefrom and formed integral therewith, and a supporting wheel for the base journaled within said hollow projection extending upward therein above the plane of the lower edge of the base.

6. The combination with a scale base having hollow integral projections extending outward from opposite edges at one end of the base, supporting wheels for the base arranged within said hollow projections, and journals for said wheels permitting the latter to extend above the plane of the lower edge of the base.

7. The combination with a substantially rectangular base frame having hollow projections extending outward from each corner thereof and formed integral with the base, and a supporting wheel for each corner of the base journaled within said hollow projections and extending upward therein above the plane of the lower edge of the base.

In testimony whereof I affix my signature in presence of two witnesses.

WALTER F. STIMPSON.

Witnesses:
NELLIE KINSELLA,
JAMES P. BARRY.